United States Patent

[11] 3,612,395

| [72] | Inventor | Christopher Durrant English, Burwell, England |
|---|---|---|
| [21] | Appl. No. | 842,152 |
| [22] | Filed | July 16, 1969 |
| [45] | Patented | Oct. 12, 1971 |
| [73] | Assignee | Tracked Hovercraft Limited, London, England |
| [32] | Priority | July 17, 1968 |
| [33] | | Great Britain |
| [31] | | 34096/68 |

[54] LINEAR MOTOR REACTION RAIL ASSEMBLY
17 Claims, 7 Drawing Figs.

[52] U.S. Cl. .................................... 238/122, 104/148 LM, 238/264, 238/283, 238/287, 238/306, 238/310, 310/12

[51] Int. Cl. ...................................... E01b 25/00, E01b 26/00

[50] Field of Search........................... 104/148, 134, 23 FS, 148 LM; 238/283, 349, 122, 264, 304–306, 287, 310; 310/12, 13

[56] References Cited

UNITED STATES PATENTS

| 1,831,701 | 11/1931 | Brandt | 238/304 |
| 2,146,341 | 2/1939 | Kahn | 238/283 |
| 2,337,497 | 12/1943 | Reddick | 238/283 |
| 3,451,621 | 6/1969 | De Splinter | 238/349 |
| 3,494,558 | 2/1970 | Brown | 238/283 |

*Primary Examiner*—Arthur L. La Point
*Assistant Examiner*—Richard A. Bertsch
*Attorney*—Cameron, Kerkam and Sutton

ABSTRACT: A reaction rail for cooperating with a linear induction motor stator connected to a high-speed vehicle is resiliently mounted for lateral movement. The stator can be guided by wheels running on the rail. Resilient blocks capable of deforming in shear are disposed between a rail-carrying member and the fixed track for the vehicle. In the preferred embodiment the resilient blocks are precompressed by rockable stirrups which reduce the tendency for the rail to tilt under a lateral force.

PATENTED OCT 12 1971 3,612,395
SHEET 1 OF 2
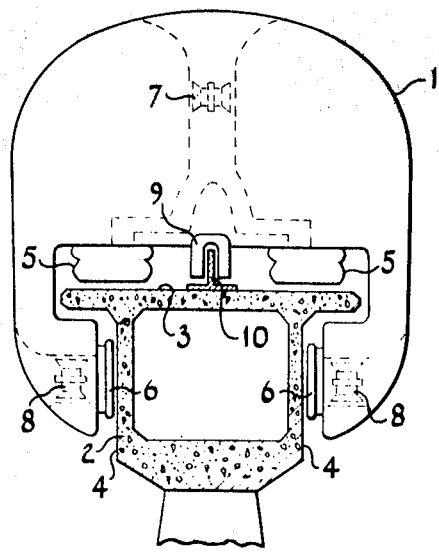
FIG 1
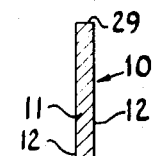
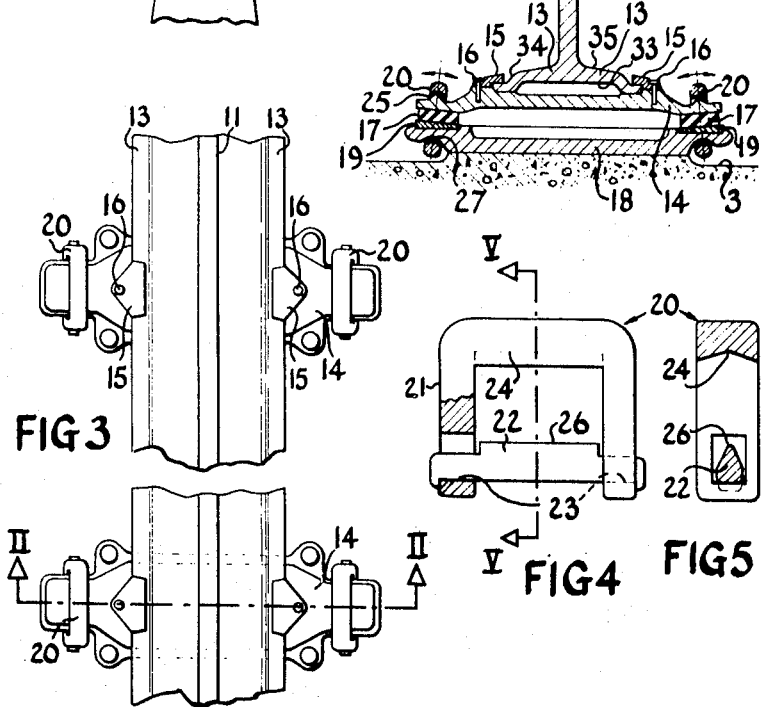

LINEAR MOTOR REACTION RAIL ASSEMBLY

This invention relates to a reaction rail assembly for a linear electric induction motor. In one known arrangement of a linear motor the energized part of the motor (known as the stator) is carried by and propels a vehicle along a track which carries the other part of the motor in the form of a fixed reaction rail (sometimes known as the rotor). The rotor and stator are so named because their functions are analogous to the rotor and stator of a rotary induction motor. It is known to have a double-sided stator for a linear motor, i.e. a stator having two parts disposed in use on opposite sides of the rail, each part having poles so that the flux path extends from one part through the rail to the other part.

British Pat. Specs. Nos. 995,127 and 1002,588 propose the use of a linear motor to propel a gas-cushion supported vehicle for travelling along a track which guides the vehicle. Vehicles of this type are capable of speeds greater than 200 m.p.h. and at such speeds a problem arises because of the difficulty of fixing the rotor to the track exactly in a straight line. The problem is that lack of alignment of the reaction rail will cause rapid sideways deflections of the stator. The problem is made particularly acute by the need for the stator to follow the rail closely since the efficiency of the motor depends on keeping the airgap between the stator and rail to a minimum.

According to the invention a linear motor reaction rail assembly includes a rail of electrically conducting material, the rail having a plate for cooperating with a double sided linear motor stator, and integral flanges extending laterally with respect to the plate from one edge of the plate, a rail-carrying member connected to the flanges and extending laterally beyond the flanges, resilient members at opposite ends of the carrying member (as seen in a lateral cross section) disposed in use between the carrying member and a fixed track, and holding means for holding the carrying member on to the track whilst permitting limited lateral movement of the plate resulting in deformation of the resilient members in shear. The rail is preferably of nonmagnetic material.

When the stator exerts a sideways force on the plate the resilient members temporarily deform in shear and the plate moves laterally. When the stator has passed, the plate will assume its original position again. By positioning the resilient members at opposite ends of the rail-carrying member there is a higher resistance to undesirable tilting movement of the plate without affecting freedom for lateral movement.

There could be one rail-carrying member extending the length of the rail, but preferably there are a number of carrying members connected to the rail at spaced positions along the length of the rail, each carrying member having associated resilient members.

Preferably the assembly includes a base member fixable to the track, and the resilient members are positioned between the base member and the carrying member or members. There is preferably a separate base member for each carrying member.

The holding means for holding the carrying member or members on to the track preferably includes a clamping member for each resilient member, each tension member being adapted to exert a compressive force urging together a carrying member and a base member.

The clamping members may simply bear on the carrying member, lateral movement of the carrying member resulting in frictional sliding movement between the clamping member and the carrying member.

In one arrangement further resilient members are positioned between each clamping member and the carrying member or members, so that each carrying member is sandwiched between resilient members. In this arrangement lateral movement of the carrying member results in deformation of both the resilient members which sandwich it.

In the preferred arrangement each clamping member consists of a stirrup which is arranged to rock upon lateral movement of the rail. For this purpose rocking edges are preferably provided between the stirrup and the carrying member, and between the stirrup and the base member.

The tendency to tilt can be reduced still further if the center lines of the resilient members and the stirrups on opposite sides of the rail are inclined inwardly towards each other with the ends of the resilient members and the ends of the stirrups furthest from the base member closest together.

Means in addition to the resilient members may be provided for damping movement of the rail.

Although the resilient members could be formed of a spring steel strip having a suitable blocklike configuration to allow deformation of the block in shear, they are preferably pads of elastomeric material.

Although the rail is preferably mounted on the track with the plate extending vertically upwards from the center of the track, it could be orientated in other ways. For example the plate could extend vertically downwards.

It is a part of known railway practice to have resilient mountings for rails which support flanged wheels to limit vibration and deaden noise. As well as differing structurally from such known arrangements, the arrangement according to the invention is a solution to a quite separate problem. Lateral mobility is an essential feature of this invention, whereas in railways it is essential to restrain the rails against sideways movement or else the wheels could fall between the rails. Railway practice can therefore not be expected to provide solutions to many of the problems of mounting a linear motor reaction rail.

In the accompanying drawings:

FIG. 1 shows a diagrammatic cross-sectional view of an air cushion vehicle mounted on a track;

FIG. 2 shows a cross section of a preferred form of rail-mounting assembly according to the invention;

FIG. 3 shows a plan view of a rail with the rail mounting of FIG. 2;

FIG. 4 shows a side view of one component of the assembly of FIG. 2;

FIG. 5 is a cross section along the line V—V of FIG. 4,

FIG. 1 shows a tracked air cushion vehicle 1 mounted on a concrete track 2.

Figure 6:
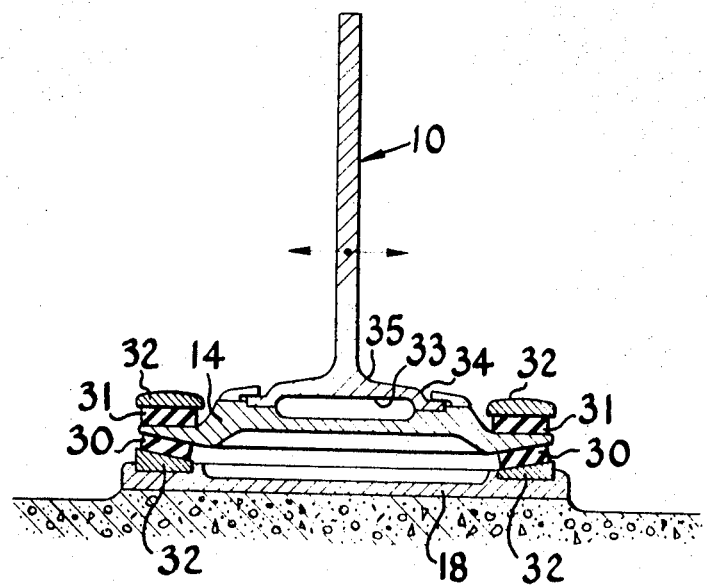
FIG. 6 is a cross-sectional view of another rail-mounting assembly according to the invention.

The track 2 has a horizontal supporting surface 3 and vertical guidance surfaces 4. The vehicle 1 has four hoverpads 5 which support it from the horizontal surface 3, and four vertical hoverpads 6 which guide the vehicle from the vertical surfaces 4. Only two hoverpads 5 and 6 are seen in the cross section in FIG. 1 which are fed with pressurized gas by fans 7 and 8. The vehicle carries a double-sided linear motor stator 9 which cooperates with a linear motor reaction rail 10 to propel the vehicle. The rail 10 extends along the track and is fixed to the center of the horizontal surface 3. The stator 9 can be connected to the vehicle in any suitable manner which allows limited movement of the stator with respect to the vehicle, for example, as described in copending application Ser. No. 817,487, filed Apr. 18, 1969, now U.S. Pat. No. 3,557,704.

FIGS. 2 to 5 show the preferred form of the reaction rail assembly. This includes the rail 10 of nonmagnetic electrically conducting material such as aluminum or stainless steel. The rail 10 has a vertical plate 11 of the order of 40 cm. high with opposite faces 12 which cooperate with the double-sided linear motor stator 9 on the vehicle. The rail 10 also has integral flanges 13 extending laterally with respect to plate 11 from the lower edge of the plate. The assembly also includes a rail-carrying member 14 which is rigidly connected to the flanges 13 by means of lugs 15 secured by bolts 16 on to the carrying member 14. Alternatively instead of lugs 15 and bolts 16 spring steel rail clips can be used to connect the flanges to the carrying member 14. The rail-carrying member 14 extends laterally beyond the flanges 13, and resilient members 17 are disposed at opposite ends of the carrying member 14, between the carrying member 14 and the track 2.

FIG. 3 shows how a number of carrying members 14 are connected to the rail 10 at spaced positions along the length of the rail. Each carrying member 14 has resilient members 17 between itself and the track 2. The carrying members are spaced at about two meter intervals along the length of the rail.

For each carrying member 14 there is a base member 18 fixed to the track 2, and the resilient members 17 are positioned between the base member 18 and the carrying member 14.

The resilient members 17 are pads of elastomeric material such as neoprene, and they are bonded to the carrying members 14 and to metal blocks 19 which are seated in recesses in the base members 18.

Each carrying member 14 is held down on to the track by stirrups 20 which constitute clamping members. There is a stirrup 20 for each resilient pad 17, and each stirrup 20 bears on a carrying member 14 and on a base member 18 and applies a compressive force to its associated resilient pad 17. The stirrups 20 (shown in detail in FIGS. 4 and 5) consist of a U-shaped part 21 and a crossmember 22 which fits into slots 23 in the ends of the arms of the U-shaped part 21. The U-shaped part 21 has a recess 24 on the inner side of its center limb which engages on to a rounded rocking edge 25 upstanding from the end of each carrying member 14. The crossmember 22 of the stirrup 20 has a rounded rocking edge 26 which engages in a recess 27 on the underside of the end of the base member 18.

When assembled the side limbs of the U-shaped part 21 of the stirrup 20 are in tension and apply a compressive force to the resilient pad 17. The stirrup 20 is mounted on to the assembly by first clamping the carrying member 14 and base member 18 together so as to compress the resilient pad 17, then fitting the U-shaped part 21 around the carrying member 14 as seen in FIGS. 2 and 3, and then, while the members 14 and 18 are still clamped together, inserting the crossmember 22. Upon releasing the clamp the compressive force in the resilient pad 17 is taken in tension in the stirrup 20.

The blocks 19 and the carrying member 14 are so shaped that the centerlines of the resilient pads 17 and the stirrups 20 on opposite sides of the rail 10 are inclined inwardly towards each other with the ends of the resilient members furthest from the track 2 closest together.

If the rail 10 is not fixed to the track 2 exactly in a straight line lateral forces will be applied to the rail when the vehicle 1 travels along the track 2 at high speed. The stator 9 must follow the rail 10 very closely since the efficiency of the linear motor depends on keeping the airgap between the stator 9 and the reaction rail 10 to a minimum. With the above described arrangement according to the invention the rail is permitted limited lateral movement up to about 1 cm., by virtue of the resilient pads 17 deforming in shear, and by virtue of the stirrup 20 rocking about the rocking edges 25 and 26. When the vehicle 1 has passed, the rail 10 will be returned to its initial position by the shearing force in the resilient pads 17.

A lateral force on the plate 11 would tend to tilt the rail 10 and this is resisted by three features of the assembly shown in FIG. 2. First, the carrying member 14 extends laterally beyond the flanges 13 so that the resilient pads 17 are widely spaced apart with respect to the plate 11. Second, the centerlines of the resilient pads are inwardly inclined so that the geometry of the system will provide a countertilting action working against the natural direction of rotation of the rail. Third, the pads 17 are precompressed by the stirrups 20 and the rail 10 therefore will not tilt until the tilting force tending to compress the pads 17 on one side exceeds the precompressive force in the pads 17.

The assembly shown in FIG. 2 also allows limited vertical movement of the rail 10, although the rail 10 will not move downwardly until the downwards force acting on it exceeds the precompressive force in the pads 17. In some proposed arrangements for mounting the stator on the rail (for example as shown in copending application Ser. No. 817,487, filed Apr. 18, 1969, now U.S. Pat. No. 3,557,704) the stator has wheels which run on the free upper edge 29 of the plate 11 and a downward force can therefore be expected if the edge 29 is not absolutely even.

Figure 7:
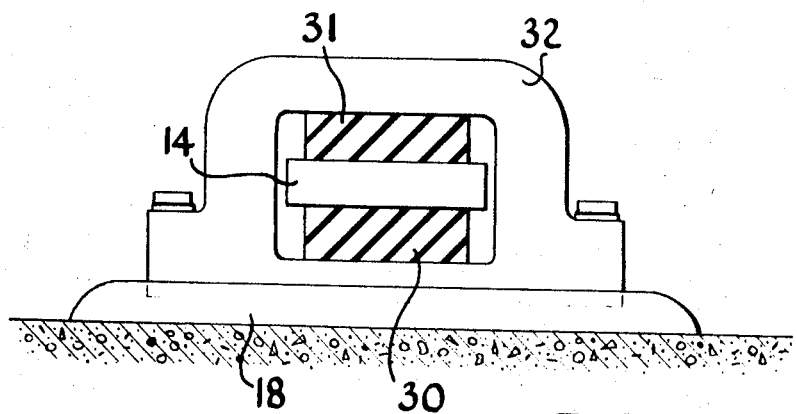
FIG. 7 is a side view of part of the assembly of FIG. 6.

FIG. 6 shows an alternative reaction rail assembly according to the invention. This arrangement is generally similar to the arrangement shown in FIG. 2 except that there are no rockable stirrups 20. Instead the ends of each carrying member 14 are sandwiched between resilient pads 30 and 31. The pads 30 are bonded to the lower face of the carrying member 14 and to clamping members 32 bolted into recesses in the base member 18. The members 32 surround both the pads 30 and 31 (as shown in FIG. 7) and apply a compressive force to the pads. The pads 31 are bonded to the upper face of the carrying member 14 and to the clamping members 32. In a modified arrangement the members 32 do not apply a precompressive force to the pads 30 and 31.

In the arrangement shown in FIG. 6 lateral movement of the rail 10 results in deformation in shear of both the pads 30 and 31 which sandwich the carrying member 14. In this arrangement any lateral force on the rail as well as producing lateral movement is also bound to produce some tilting of the rail.

In the arrangements illustrated in both FIGS. 2 and 6 the flanges 13 are shaped to form a recess 33 between the rail 10 and the carrying member 14. This recess 33 serves to receive a fishplate for joining abutting lengths of rail 10. The flanges 13 are also shaped so that the lugs 15 seat in recesses 34 and do not project upwardly above the top surface 35 of the flanges 13. This will prevent the lugs 15 being ripped off if the stator 9 should bottom on the flanges 13.

The free upper edge 29 of the rail 10 could be thickened locally to strengthen the rail 10 or to act as a bearing surface for a wheel which supports the stator 9.

I claim:

1. A linear motor rail assembly comprising a rail having a reaction plate of electrically conductive material for electromagnetic cooperation with a double-sided linear induction motor stator, at least one rail-carrying member connected to the rail and having opposed arms which extend laterally on either side of the plate at one edge of the rail, resilient members of elastomeric material each secured at a first part thereof to a respective arm of the rail-carrying member, and holding means for attaching the rail to a fixed track, the holding means being secured to a second part of each resilient member which is spaced from the respective first part in a plane substantially parallel to the reaction plate, whereby lateral forces on the reaction plate in operation may cause lateral movement of the rail by shear in the resilient members.

2. An assembly as claimed in claim 1 in which the holding means includes a base member fixable to the track, the resilient members being positioned between the base member and the carrying member.

3. An assembly as claimed in claim 1 in which the holding means includes a base member fixable to the track and a clamping member for each resilient member, each clamping member being adapted to exert a compressive force urging together a carrying member and a base member, with the resilient members disposed between the base member and the carrying member.

4. An assembly as claimed in claim 1 in which the holding means includes a base member fixable to the track and a clamping member adapted to exert a compressive force urging together a carrying member and a base member, with the resilient members disposed between the base member and the carrying member, and in which further resilient members are positioned between each clamping member and the carrying member so that each carrying member is sandwiched between resilient members.

5. An assembly as claimed in claim 1 in which the holding means includes a base member fixable to the track and stirrups adapted to exert a compressive force urging together a carrying member and a base member with the resilient members disposed between the base member and the carrying member, the stirrups being arranged to rock upon lateral movement of the rail.

6. An assembly as claimed in claim 1 in which the holding means includes a base member fixable to the track and stirrups adapted to exert a compressive force urging together a carrying member and a base member with the resilient members disposed between the base member and the carrying member, each stirrup having a rocking edge which bears on the base member and being adapted to rock upon lateral movement of the rail.

7. An assembly as claimed in claim 1 mounted on a track for supporting and guiding a vehicle.

8. An assembly as claimed in claim 1 in combination with a double-sided linear induction motor stator adapted to cooperate with the rail.

9. An assembly as claimed in claim 1, wherein the holding means are arranged to limit the separation of the said parts of each resilient member when a said lateral force places the resilient member in tension.

10. An assembly according to claim 1, wherein each resilient member is disposed between the respective said arm of the rail-carrying member and a further arm carried by a member attachable to the track and forming part of the holding means, the holding means further comprising a stirrup member at each side of the reaction plate, the stirrup members encircling the respective arms and further arms with the resilient members therebetween and engaging the respective arms and further arms in rocking relationship whereby by rocking to accommodate a said lateral movement of the rail.

11. An assembly according to claim 10, wherein the first and second parts of each resilient member are spaced-apart transversely of the rail and the stirrup members are inclined inwardly towards each other, the ends of the stirrups nearest to the reaction plate being closest together.

12. An assembly according to claim 1, wherein each resilient member is disposed between the respective said arm of the rail-carrying member and a further arm carried by a member attachable to the track and forming part of the holding means, the holding means further comprising a stirrup member at each side of the reaction plate, the stirrup members encircling the respective arms and further arms with the resilient members therebetween and being arranged to supply compressive forces to the resilient members.

13. An assembly according to claim 1, wherein each resilient member is disposed between the respective said arm of the rail-carrying member and a further arm carried by a member attachable to the track and forming part of the holding means, the holding means further comprising a stirrup member at each side of the reaction plate, the stirrup members encircling the respective arms and further arms with the resilient members therebetween whereby to apply compressive forces to the resilient members, and engaging the respective arms and further arms in rocking relationship whereby by rocking to accommodate a said lateral movement of the rail.

14. An assembly according to claim 1, which includes a pair of said resilient members for each arm of the rail-carrying member, the resilient members of each pair being disposed on opposite sides of the respective said arm so that each arm is sandwiched between resilient members.

15. An assembly according to claim 14, wherein the holding means is arranged to apply a compressive force to the resilient members of each pair in series.

16. A linear motor rail assembly comprising a rail having a reaction plate of electrically conductive material for electromagnetic cooperation with a double-sided linear induction motor stator, at least one rail-carrying member connected to the rail and having opposed arms which extend laterally on either side of the plate at one edge of the rail, resilient members of elastomeric material each secured at a first part thereof to a respective arm of the rail-carrying member, and holding means for attaching the rail to a fixed track, the holding means being secured to a second part of each resilient member which is spaced from the respective first part in a plane substantially parallel to the reaction plate, whereby lateral forces on the reaction plate in operation may cause lateral movement of the rail by shear in the resilient members, the holding means including a base member fixable to the track and stirrups adapted to exert a compressive force urging together a carrying member and a base member with the resilient members disposed between the base member and the carrying member, each stirrup having a recess for engaging a rocking edge on the carrying member and being adapted to rock upon lateral movement of the rail.

17. A linear motor rail assembly comprising a rail having a reaction plate of electrically conductive material for electromagnetic cooperation with a double-sided linear induction motor stator, at least one rail-carrying member connected to the rail and having opposed arms which extend laterally on either side of the plate at one edge of the rail, resilient members of elastomeric material each secured at a first part thereof to a respective arm of the rail-carrying member, and holding means for attaching the rail to a fixed track, the holding means being secured to a second part of each resilient member which is spaced from the respective first part in a plane substantially parallel to the reaction plate, whereby lateral forces on the reaction plate in operation may cause lateral movement of the rail by shear in the resilient members, the holding means including a base member fixable to the track and stirrups adapted to exert a compressive force urging together a carrying member and a base member with the resilient members disposed between the base member and the carrying member, the stirrups on opposite sides of the rail being inclined inwardly towards each other, with the ends of the stirrups furthest from the base member closest together.